July 31, 1962 A. R. THOMSON 3,046,736
DIRECTION CONTROL FOR GELATIN MONOPROPELLANT ROCKET ENGINE
Filed Feb. 10, 1958 4 Sheets-Sheet 1
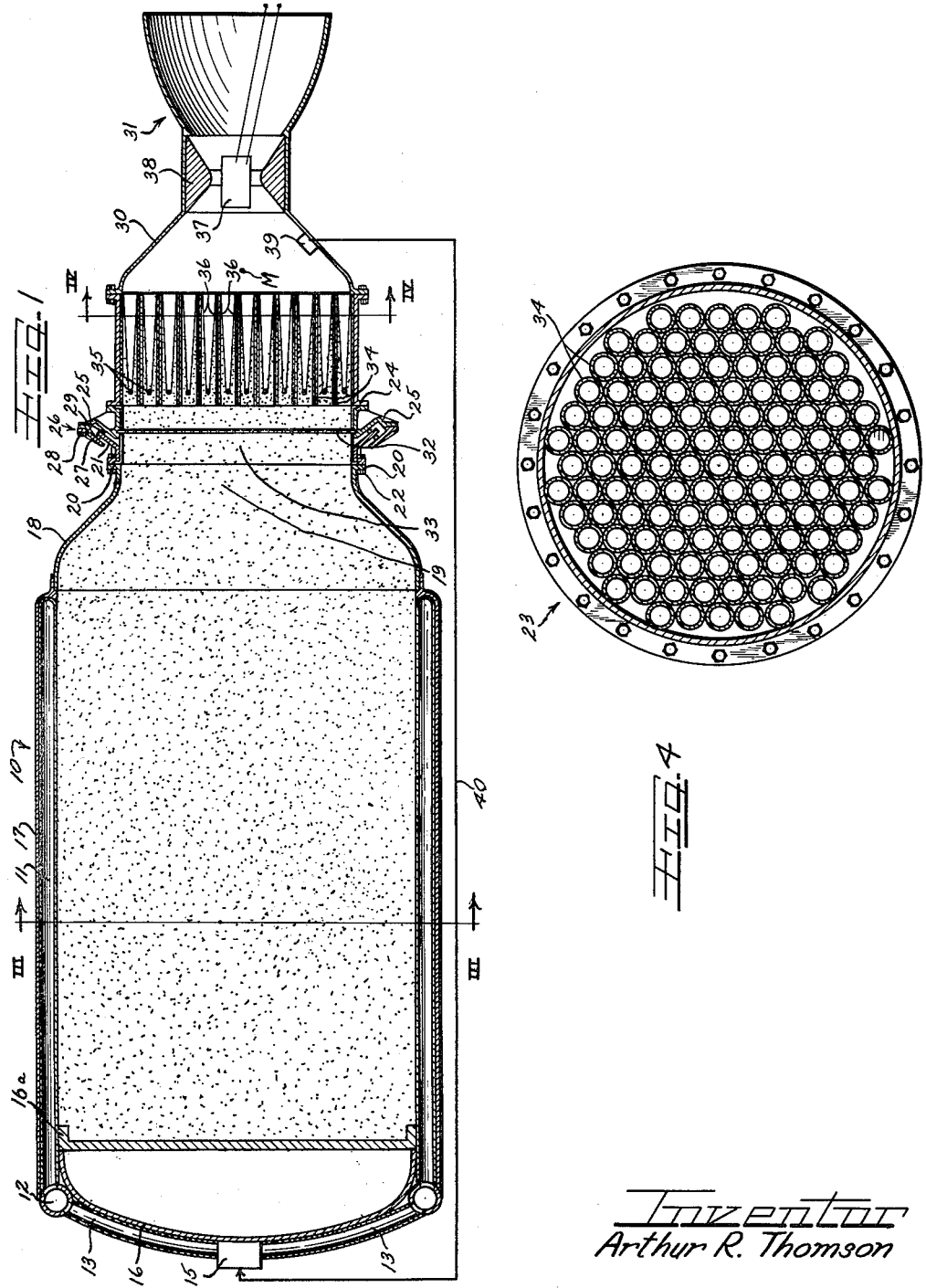
Inventor
Arthur R. Thomson July 31, 1962 A. R. THOMSON 3,046,736
DIRECTION CONTROL FOR GELATIN MONOPROPELLANT ROCKET ENGINE
Filed Feb. 10, 1958 4 Sheets-Sheet 2
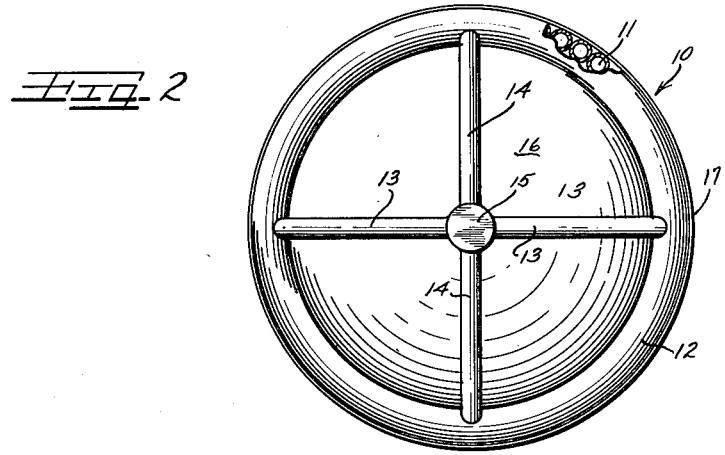
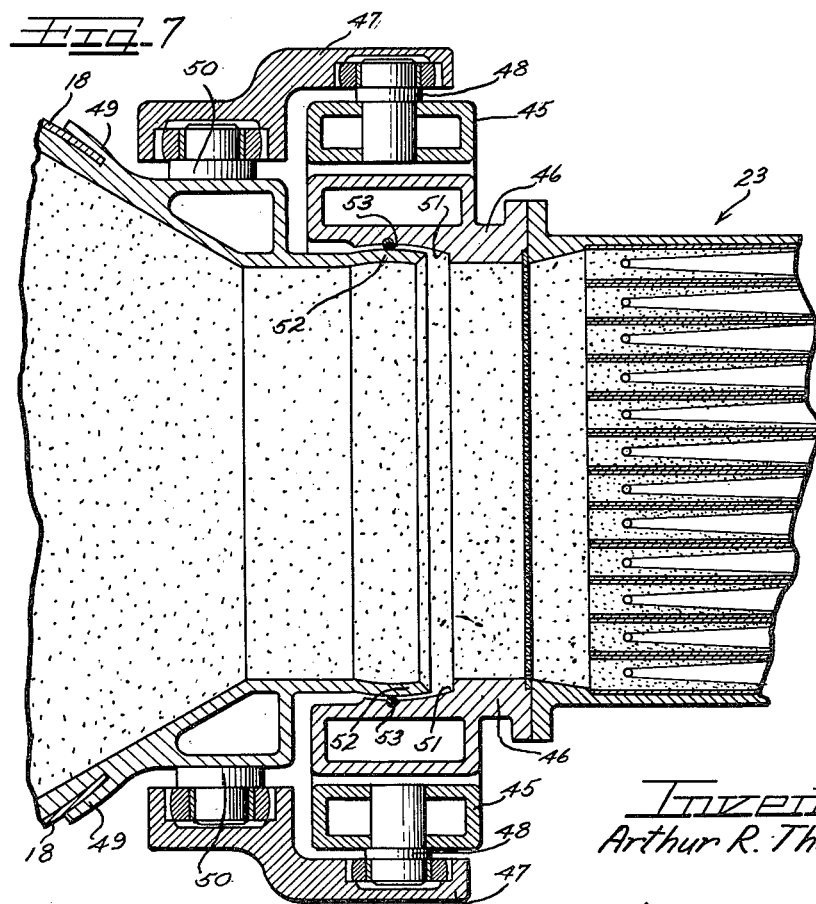
Inventor
Arthur R. Thomson

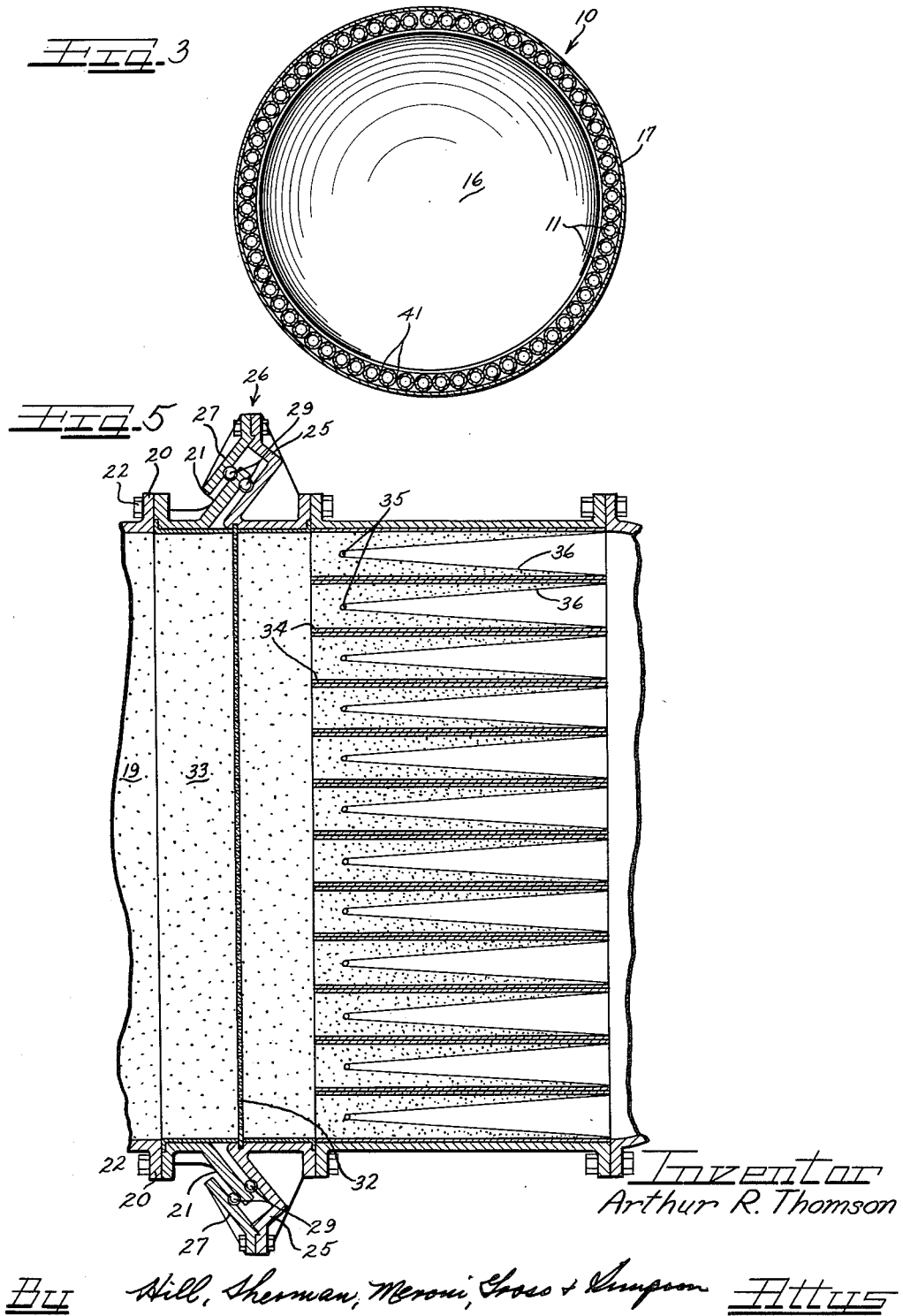

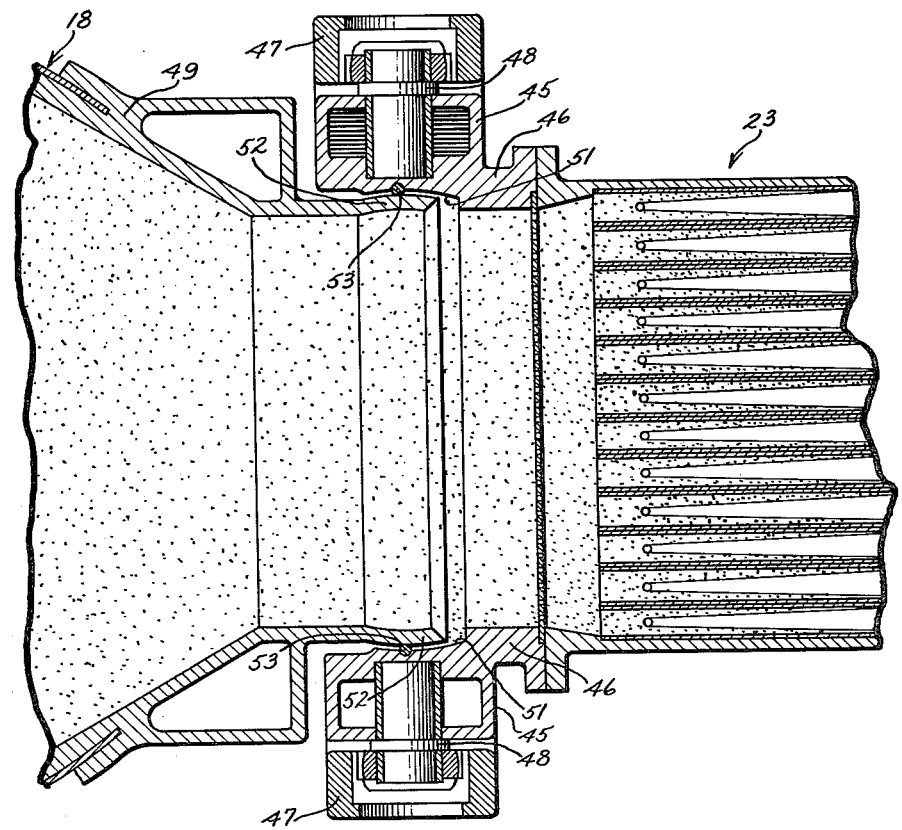

United States Patent Office 3,046,736
Patented July 31, 1962

3,046,736
DIRECTION CONTROL FOR GELATIN MONO-PROPELLANT ROCKET ENGINE
Arthur R. Thomson, Cleveland, Ohio, assignor to Thompson Ramo Wooldridge Inc., a corporation of Ohio
Filed Feb. 10, 1958, Ser. No. 714,316
6 Claims. (Cl. 60—35.55)

This invention relates to a rocket engine. More particularly, this invention relates to a gimbaled rocket engine adapted to burn a gelatinous material as a propellant or fuel.

A feature of this invention resides in the provision of gimbaling or other means for adjustably attaching the combustion chamber and nozzle of a rocket engine to the fuel tank thereof so that the direction of thrust of the exhaust gases from the nozzle can be remotely controlled in flight to correct for any possible launching errors of the rocket. Heretofore such gimbaling of the combustion chamber and nozzle of a rocket would have been impracticable due to the fact that a gimbaling structure located at this point in the rocket would be subjected to extremely high temperatures resulting from the burning of a solid or liquid propellant. In the present invention, on the other hand, a rocket engine is provided which burns a gelatinous propellant or fuel in such a manner that the gimbaling structure and various other control members can be operated at very low temperatures. The fact that most of the structure operates cold, permits the use of lighter weight materials which render the gimbaling control of the present invention practicable. The structural arrangements possible, with most of the engine being operated cold, also leads to large reductions in the cost of manufacture of the rocket. In spite of this cost and weight reduction, the rocket engine of the present invention provides increased structural stiffness for transit and ground handling, affords the possibility of modulating or terminating thrust in flight on command, and provides a substantial increase in range over the best known solid or liquid propellant engines of the same thrust.

It is then an object of this invention to provide a rocket engine particularly adapted to burn a gelatin propellant as a fuel.

It is a further object of this invention to provide a rocket engine, the direction of thrust of which can be controlled by gimbaling a portion of the structure which operates at a relatively low temperature.

It is a further object of this invention to provide a rocket engine, the thrust of which can be modulated and terminated in flight on command.

It is a further object of this invention to provide a rocket engine of improved structural stiffness and strength, which is economical to manufacture and which affords an increased ratio of range to thrust.

Briefly, in accordance with one aspect of this invention, a rocket engine is provided having a cylindrical fuel tank one restricted end of which is in open communication with a combustion chamber arranged coaxially with the fuel tank. The walls of the fuel tank are formed by a plurality of tubes containing gas under pressure which is metered into the forward end of the fuel tank in back of a piston to force the gelatin propellant into the combustion chamber. The combustion chamber contains a plurality of combustion tubes each of which has a fuel dividing element at the entrance thereto and all of which discharge the gases of combustion into an exhaust nozzle. Since the major portion of the combustion occurs at the nozzle end of the combustion chamber and since the entering gelatin fuel provides an excellent heat sink, the forward end of the combustion chamber operates cold or at a relatively low temperature. It is therefore possible to adjustably attach the combustion chamber and exhaust nozzle to the fuel tank by gimbals or any other suitable means to permit variation of the direction of the thrust of the gases discharged from the exhaust nozzle in flight.

While the novel and distinctive features of the invention are particularly pointed out in the appended claims, a more expository treatment of the invention, in principle and in detail, together with additional objects and advantages thereof is afforded by the following description and accompanying drawings, wherein like reference characters have been used to refer to like parts throughout and in which:

FIGURE 1 is a cross-sectional view of a rocket engine;

FIGURE 2 is a front elevational view, partly broken away, of the rocket engine of FIGURE 1;

FIGURE 3 is a sectional view taken on the line III—III of FIGURE 1;

FIGURE 4 is a sectional view taken on the line IV—IV of FIGURE 1;

FIGURE 5 is a fragmentary sectional view on an enlarged scale of the gimbal structure shown in FIGURE 1;

FIGURE 6 is a fragmentary sectional view, similar to FIGURE 5, but showing an alternative form of gimbal structure which may be used;

FIGURE 7 is a fragmentary sectional view of the structure shown in FIGURE 6 but showing the gimbal structure rotated 90° for clarity of illustration.

Rocket engines have in the past commonly been fueled by liquid or solid mono-propellants. More recently gelatin mono-propellants have been developed which combine many of the advantages and eliminate many of the disadvantages of both solid and liquid propellants. Such gelatin monopropellant fuels are extrudible plastic viscous slurries or gelatinous materials. Numerous suitable mono-propellant mixtures can be made into this form. Such mixtures preferably comprise a stable dispersion of a finely-divided insoluble solid oxidizer in a continuous matrix of an oxidizable liquid fuel. The liquid fuel can be any oxidizable liquid, preferably an organic liquid containing carbon and hydrogen. Such liquid fuels include hydro-carbons such as triethyl benzine, dodecane and the like; compounds containing oxygen linked to a carbon atom such as esters including methyl maleate, diethyl phthalate, butyl oxalate, and the like; alcohols such as benzyl alcohol, triethylene glycol and the like; ethers such as methyl o-naphthyl ether and the like, and many others.

The solid oxidizer can be any suitable active oxidizing agent which yields an oxidizing element such as oxygen, chlorine or fluorine readily for combustion of the fuel and which is insoluble in the liquid fuel vehicle. Such oxidizers include inorganic oxidizing salts such as ammonia, sodium and potassium perchlorate or nitrate and metal peroxides such as barium peroxide.

Finely divided solid metal powders, such as aluminum or magnesium, may be incorporated in the mono-propellant composition as an additional fuel component along with the liquid fuel. Such metal powders possess the advantages both of increasing the fuel density and improving the specific impulse of the mono-propellant because of their high heats of combustion.

Gelling agents for imparting the desired cohesiveness and flow characteristics to the plastic mixture include natural and synthetic polymers such as polyvinyl chloride, polyvinyl acetate, cellulose esters such as cellulose acetate, cellulose ethers such as ethyl cellulose, metal salts of higher fatty acids such as the sodium or magnesium stearates and palmitates.

The amount of oxidizer is preferably at a stoichiometric level with respect to the liquid fuel, although minimum concentrations of solid oxidizer as low as 40% by weight are operative. In general, the oxidizer will constitute about 65% by weight of the mixture. A preferred operative gelatin mono-propellant includes a gel composed of up to 50% by weight of a liquid fuel, from 40 to 65% by weight of an oxidizer and from 3 to 10% of a gelling agent. A specific operative fuel can be composed of about 50% by weight of solid oxidizers such as potassium perchlorate, about 45% by weight of liquid fuel such as triethyl benzene, and about 5% by weight of a gelling agent such as ethyl cellulose. It is to be understood, however, that this invention is not limited to use with any particular gelatin mono-propellant mixture, but rather is directed to a rocket engine structure which is particularly adapted to use any one of such propellants.

Turning now to the drawings, there is shown in FIGURE 1 thereof by way of example a generally cylindrical fuel tank 10 adapted to contain a gelatin mono-propellant fuel. The longitudinal wall of tank 10 is formed by a plurality of tubes 11 adapted to store under pressure an inert gas such as nitrogen. The forward end of each tube 11 opens into a circular or annular header 12 which forms a part of the structure of the forward wall of the fuel tank 10. Header 12 is connected by horizontal and vertical conduits 13 and 14 to a metering inlet valve 15 to the tank 10. A generally round front member 16 is welded or otherwise attached to the inner surfaces of tubes 11 and is also similarly attached to header 12 and conduits 13 and 14. The member 16 serves to seal the gelatin propellant within the tank 10. A piston member 16a is mounted for longitudinal movement in tank 10 and acts to extrude the gelatin propellant when gas pressure is applied in back of the piston. A sheet of fiberglass 17 may conveniently be placed around the outer surfaces of the tubes 11 to further seal the fuel within the tank 10. The rear or after portion of tank 10 is formed by a metallic member 18 which may conveniently taper down to form a circular outlet opening 19 for the fuel tank. The member 18 terminates in an annular flange member 20 to which a stationary member 21 of a gimbal mounting may be secured as by bolts 22 for a purpose to be described in greater detail below.

A combustion chamber 23 which may, for example, be generally cylindrical terminates at its open forward end in an annular flange 24 to which is secured a second member 25 of annular gimbal mounting 26. A third member 27 thereof is secured to second member 25 by bolts 28. Annular members 25 and 27 form a generally U-shaped assembly which is fitted over the fixed member 21 and journaled thereon for limited angular movement by bearings 29. The rear or after portion of the combustion chamber 23 terminates in a tapered outlet section 30 to which is attached an exhaust nozzle 31.

The gimbal mounting 26 shown in FIGURE 1 is arranged so that movement about the mass center M of the swiveling elements is obtained. That is to say, the combustion chamber 23 and nozzle 31 form a rigid assembly which has a mass center M which does not change its position in flight since the gimbals 26 are so proportioned that any movement of the combustion chamber and nozzle assembly constitutes a rotation about the point M as a fixed pivot point. The gimbal rings 21 and 25 carry the full thrust of the gases discharged from the exhaust nozzle to the fixed portion of the engine. The fact that the combustion chamber and exhaust nozzle can be gimbaled for rotation about a fixed mass center is of great importance since no resisting forces exist in flight to counteract forces induced by gimbaling about some point other than mass center.

The propellant must be extruded as a slug and applied to the open inlets of a plurality of combustion tubes 34 mounted coaxially in combustion chamber 23. When gas pressure is first applied to piston 16a to cause this extrusion, the gelatin breaks through a foil fuel seal mounted as by holder 32 or in any convenient manner in annular member 25 or otherwise generally at or near the inlet of the combustion chamber. This foil seal prevents leakage of the fuel during ground handling when the rocket may be in an upright position. The foil fuel seal could equivalently be replaced by a light plastic or metal disk.

The fuel slugs formed by the individual combustion tubes 34 when the fuel is extruded are split by the combustion tubes' splitters 35 which may for example consist of a wire mounted transversely of the tube. The fuel burns along the cut surfaces 36 after being ignited in any convenient manner by an igniter 37 mounted between an annular graphite member 38 forming a part of nozzle 31. Igniter 37 may for example consist of electrically fired squibs, hot wires, or any other convenient igniting means. The gas generated by the combustion process is accelerated through the rocket nozzle to produce thrust. Control of the magnitude of this thrust is provided by sensing combustion chamber pressure by means of any conventional pressure sensitive transducer 39 and applying the output signal of transducer 39 over a control lead 40 to control the position of the modulating and cut off valve 15 at the forward end of the fuel tank so as to regulate the flow of pressurized gas from tubes 11 through manifold 13 and thence into the interior of fuel tank 10. The amount of pressurized gas admitted to fuel tank 10 of course determines the rate at which the gelatin propellant fuel is extruded from tank 10 to the combustion chamber 23. Since the mass burning rate of the fuel is in turn proportional to the rate at which it is extruded into the combustion chamber, this in turn controls the amount of thrust developed.

The partly broken away front elevational view of the fuel tank 10 shown in FIGURE 2 illustrates in detail the manner in which the pressurized gas tubes 11 forming the main outer wall of the fuel tank 10 are connected to header or manifold 12 which in turn is connected through conduits 13 and 14 to the modulating and cut-off valve 15 through which the pressurized gas is admitted to fuel tank 10 to drive the gelatin propellant or fuel into combustion chamber 23.

The sectional view of FIGURE 3 which is taken on the line III—III of FIGURE 1 shows in greater detail how the fiberglass sheathing 17 surrounds the pressurized gas tubes 11 so as to completely seal the fuel within fuel tank 10. Since the fuel tank 10 operates "cold" or at relatively low temperatures, the pressurized gas tubes may be made of aluminum or other lightweight material and may be conveniently welded or otherwise rigidly attached together at their junction points 41.

FIGURE 4 is a cross sectional view of the combustion chamber 23 taken on line IV—IV of FIGURE 1 but showing the combustion chamber 23 detached from the gimbal mounting 26. The combustion tubes 34 may conveniently be welded together at their points of contact and the entire assembly then welded or otherwise attached to the outer wall of the combustion chamber 23. A fuel splitter 35 is mounted in the forward end of each of the combustion tubes 34.

In FIGURE 5 the portion of FIGURE 1 including the gimbal mounting 26 has been reproduced on an enlarged scale for greater clarity of detail. Like reference characters are used to identify like parts.

In FIGURES 6 and 7 there is illustrated an alternative form of gimbal ring structure which may be used to mount the combustion chamber 23 on the fuel tank 18. In this arrangement an inner gimbal ring 45 is rigidly attached by a flange member 46 to the combustion chamber. An outer gimbal ring 47 is movably supported on inner ring 45 by a bearing member 48. Outer ring 47 is similarly movably supported on a flange 49 rigidly attached to the fuel tank 18 by a bearing member 50. Flanges 46 and 49 respectively have arcuate portions 51 and 52 which are movably supported in juxtaposed relationship by a bearing 53. The arrangement is such as to permit the longitudinal axis of the combustion chamber to be moved through a limited angle in any direction away from its normal position of coaxial alignment with the longitudinal axis of the fuel tank. It should be course understood that the gimbaling arrangement shown in FIGURES 6 and 7 and in FIGURES 1 and 5 respectively are exemplary only and that any suitable arrangement could be used to adjustably attach the combustion chamber 23 to fuel tank 18.

In operation, the gelatin propellant or fuel is stored in fuel tank 10 before the combustion chamber and nozzle are attached thereto by bolts 22. The pressurized gas, which is preferably an inert gas such as nitrogen, is also stored in the gas tubes 11 forming the wall of fuel tank 10. This gas may be admitted to the tubes through valve 15 or by any other convenient means. The rocket is fired by electrically firing the igniter 37 at the same time that an electrical control signal is applied (by means not shown) to open the valve 15 and admit pressurized gas to tank 10 in order to feed the gelatin propellant to the combustion chamber. As noted above, the rate of flow of the pressurized gas may be controlled by regulating the valve 15 which in turn controls the rate at which the gelatin propellant is fed to the combustion chamber and hence controls the burning rate and the thrust of the rocket resulting form the combustion gases being accelerated through the exhaust nozzle. The thrust may thus be controlled to a fixed or variable level by remotely controlling the response characteristics of transducer 39 which senses combustion chamber pressure and regulates the valve 15 in accordance therewith. Of course, any other convenient means could also be used to control valve 15. It could, for example, be made responsive to acceleration, ambient temperature or pressure, or it could be controlled by the inertial guidance system of the missile or remotely in a programmed manner.

Rocket thrust can be terminated virtually completely by closing the pressurized gas regulator valve 15 to prevent any further flow of gas to the propellant storage tank and venting the gas already metered to the tank to ambient atmosphere to completely stop extrusion of propellant to the burner tube. This venting may be accomplished either through an auxiliary position of the metering valve 15 or by any other suitable or conventional means. When the rocket is in flight, the direction of thrust can be varied by virtue of the fact that the rocket combustion chamber and exhaust nozzle is supported as a unitary assembly from the fuel tank by gimbal rings. The direction of thrust of the gas discharged from the exhaust nozzle can thus be varied by using any suitable means forming a part of the rocket in which the engine is mounted to vary the position of the exhaust nozzle so that any launching or windage errors in the rocket or missile trajectory can be corrected during flight.

It should be noted that the gelatin propellant fuel has to a high degree the safety and ease of handling characteristic of solid propellants. On the other hand, the fuel burning and therefore the thrust are easily initiated, modulated and stopped as is the case in liquid propellant systems. Furthermore, large weight savings in the overall structure are gained because most of the rocket operates at relatively low temperatures. This also permits the use of lower cost materials and methods of fabrication. The rocket structural mass to gross mass ratio is lower than is the case with other known engine configurations. The fact that only the rear or after portion of the combustion chamber and the exhaust nozzle operate at high temperatures also permits the combustion chamber and nozzle to be attached to the fuel tank by gimbals made of a relatively light weight material since the gimbals do not have to withstand high temperatures. Swiveling of the combustion chamber and exhaust nozzle about their main center permits flight at the lowest body drag and allows compensation of the flight path for launching errors, windage, etc. The gimbal rings carry the full thrust of the rocket to the fixed portions of the engine and would have to be extremely heavy in a large engine if they had to operate hot. Cold operation permits the use of aluminum or other light weight metals which do not render the gimbaling structure impractical from the point of view of overly impairing the structural to gross mass ratio. Furthermore, the gimbals are so arranged that movement about the mass center of the swiveling elements is obtained. This feature is highly desirable since no resisting forces exist in flight to counteract forces induced by gimbaling about some point other than mass center of the combustion chamber and the exhaust nozzle.

The rocket engine is further characterized by an improved space economy which permits more freedom in the basic missile shape and structural design. Both the material and the shape of the fuel tank may be selected to best suit the needs of a given missile and/or a given mission. It may, for example, be desirable in some missiles to store the fuel remotely and feed it to the combustion chamber through a pipe to which the combustion chamber is gimbaled. Further, accurate control of burnout velocity, hence the missile impact point, can be achieved by actuation of cold valves which need not be designed to withstand high operating temperatures. Also, the gel propellant rocket can be prelaunch fired for testing purposes and thereafter be easily refueled. Reliability is therefore more easily established than in a solid fuel rocket. This reliability is further enhanced by the very small number of moving parts and by the fact that all of these moving parts operate at relatively low temperatures.

The fuel tank and its associated hardware operate cool and can thus be made from lightweight inexpensive materials such as aluminum. The gelation propellant is extruded by the pressurized gas from the fuel tank into the combustion chamber where it is burned to produce gases which in turn produce a thrust proportional to the burning surface area. This area is in turn, of course, proportional to the rate of feed of the gel propellant. By virtue of this combustion system the hot heavy portion of the engine, that is to say, the combustion chamber and exhaust nozzle, is kept small thereby decreasing the weight and saving strategic materials. The fuel tank configuration also provides space economy since the pressurized gas which controls the feed of the propellant is stored in the aluminum or other tubes forming the fuel tank wall. These tubes which carry the longitudinal loads are circumferentially wound with fiberglass to carry the circumferential loads and to seal the tank against leakage. The fore and after end portions of the tank are welded or otherwise attached to the tubes to complete this seal. This tank construction produces substantial weight and cost savings over currently used sheet metal tanks of the same size. The fuel may be extruded by means of pressurized gas, incompressible fluids or pure mechanical force thus affording a wide choice of control systems. It is thus seen that I have provided a gelatin propellant rocket engine which by virtue of the fact that most of the engine operates cold permits a structural arrangement which affords large weight and cost reductions, as well as increased structural stiffness for transit and ground handling. Furthermore, the engine thrust can be modulated in flight on remote command and the thrust direction can be controlled by a cold gimbaling of the combustion chamber and nozzle. In performance, the gel propellant rocket engine of the present invention provides approximately a 20% increase in range over the best currently known solid propellant engine of the same thrust.

While the principles of the invention have now been made clear, there will be immediately obvious to those skilled in the art, many modifications of structure, arrangement, proportions, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

I claim as my invention:

1. A gelatin mono-propellant rocket engine comprising a fuel tank adapted to contain said gelatin monopropellant, a combustion chamber unit, one end of said fuel tank being in open communication with one end of said unit, said one end of said fuel tank having substantially the same cross-sectional area as said one end of said unit at the point of open communication, means to extrude said gelatin monopropellant from said fuel tank to the combustion chamber defining portion of said unit, means to ignite said gelatin monopropellant supplied to said combustion chamber portion, an exhaust nozzle rigidly attached to the other end of said unit, and said unit being adjustably attached to said fuel tank at said point of open communication to permit variation in the direction of thrust of gases discharged from said nozzle.

2. A gelatin monopropellant rocket engine comprising, a generally cylindrical fuel tank adapted to contain said gelatin monopropellant, a combustion chamber unit having a plurality of combustion tubes therein, means in each of said tubes for splitting fuel slugs of said gelatin propellant being extruded through said tubes, the forward end of said fuel tank being in open communication with the after end of said unit, an exhaust nozzle rigidly attached to said after end of said unit, pressure operated means to extrude said gelatin propellant from said fuel tank to the combustion chamber defining portion of said unit, means to ignite said gelatin propellant supplied to said combustion chamber portion, and the forward end of said unit being attached to the after end of said fuel tank by a gimbal mounting to permit variation in the direction of thrust of gases discharged from said nozzle.

3. A gelatin monopropellant rocket engine comprising, a fuel tank adapted to contain said gelatin monopropellant, a combustion chamber unit, one end of said fuel tank being in open communication with one end of said unit, means to controllably admit a gas under pressure to said fuel tank to extrude said gelatin monopropellant to the combustion chamber defining portion of said unit, fuel seal means mounted in the path of extrusion to prevent the formation of bubbles by said gas in said gelatin monopropellant, means in said combustion chamber portion of the unit to ignite said gelatin monopropellant, an exhaust nozzle rigidly attached to the other end of said unit, and said unit being adjustably attached to said fuel tank to permit swiveling action of said unit and said exhaust nozzle for varying the direction of thrust of gases discharged from said nozzle.

4. A gelatin monopropellant rocket engine comprising, a fuel tank adapted to contain said gelatin monopropellant, a combustion chamber unit, one end of said fuel tank being in open communication with one end of said unit, means to extrude said gelatin monopropellant from said fuel tank to the combustion chamber defining portion of said unit, means to ignite said gelatin monopropellant supplied to said combustion chamber defining portion of said unit, an exhaust nozzle rigidly attached to the other end of said unit to form a unitary assembly, and gimbal means attaching said unitary assembly to said fuel tank to permit swiveling movement of said unitary assembly about its own mass center to vary the direction of thrust of gases discharged from said exhaust nozzle in flight without introducing unbalanced forces.

5. A gelatin mono-propellant rocket engine comprising, a fuel tank adapted to contain said gelatin mono-propellant, at least one wall of said fuel tank comprising a hollow structure adapted to contain a gas under pressure, a combustion chamber unit in open communication with said fuel tank, means to controllably admit said gas under pressure to said fuel tank to extrude said gelatin monopropellant from said fuel tank to the combustion chamber defining portion of said unit at a controlled rate, means to ignite said gelatin mono-propellant in said combustion chamber portion, an exhaust nozzle rigidly attached to said combustion chamber unit to form a unitary assembly, a seal between said tank and unitary assembly, and gimbal means attaching said unitary assembly to said fuel tank to permit swiveling movement of said unitary assembly about its own mass center to vary the direction of thrust of gases discharged from said exhaust nozzle in flight without introducing unbalanced forces.

6. In a gelatin mono-propellant rocket engine, a generally cylindrical fuel tank adapted to contain said gelatin mono-propellant, said tank comprising a plurality of hollow elongated tubes adapted to contain an inert gas under pressure, said tubes being continuously arranged in a configuration having a generally circular cross section to form the longitudinal wall of said generally cylindrical fuel tank, each of said tubes being rigidly attached to the adjacent tube in said configuration, a sheath of sealing material wrapped around the outside of said assembly of tubes and attached thereto, a front end member rigidly attached to one end of each of said tubes and completely sealing the front end of said fuel tank, a tapered after end member rigidly attached to the other end of each of said tubes and forming an outlet from said tank, a combustion chamber unit and an exhaust nozzle forming a unitary assembly, said combustion chamber unit having an inlet juxtaposed to said outlet from said fuel tank, gimbal means to mount said unitary assembly on said fuel tank to permit swiveling of said unitary assembly about its own mass center, means connecting one end of each of said hollow elongated tubes forming the wall of said fuel tank to a gas inlet valve to supply gas under pressure to the interior of said tank to extrude said gelatin mono-propellant from said fuel tank to said combustion chamber, fuel seal means in the path of said extrusion, means in said combustion chamber to ignite said mono-propellant, and means to regulate the position of said gas inlet valve in accordance with the pressure in said combustion chamber.

References Cited in the file of this patent

UNITED STATES PATENTS

| | | |
|---|---|---|
| 2,500,537 | Goddard | Mar. 14, 1950 |
| 2,523,655 | Goddard | Sept. 26, 1950 |
| 2,621,719 | Eaton et al. | Dec. 16, 1952 |
| 2,639,582 | Pearlman | May 26, 1953 |
| 2,671,312 | Roy | Mar. 9, 1954 |
| 2,676,460 | Brown | Apr. 27, 1954 |
| 2,782,593 | Lee et al. | Feb. 26, 1957 |
| 2,790,489 | Denison | Apr. 30, 1957 |
| 2,847,148 | Altseimer | Aug. 12, 1958 |
| 2,858,672 | Clark | Nov. 4, 1958 |
| 2,874,539 | Fox | Feb. 24, 1959 |
| 2,937,698 | Greenlee | May 24, 1960 |
| 2,943,828 | Van Driest | July 5, 1960 |
| 2,950,133 | Johnson et al. | Aug. 23, 1960 |

FOREIGN PATENTS

| | | |
|---|---|---|
| 582,621 | Great Britain | Nov. 22, 1946 |